US011406239B2

(12) United States Patent
Sasaki et al.

(10) Patent No.: US 11,406,239 B2
(45) Date of Patent: Aug. 9, 2022

(54) ELECTRIC CLEANING APPARATUS, STATION, AND VACUUM CLEANER

(71) Applicant: TOSHIBA LIFESTYLE PRODUCTS & SERVICES CORPORATION, Kawasaki (JP)

(72) Inventors: Hironori Sasaki, Nagoya (JP); Takahiro Murosaki, Owariasahi (JP)

(73) Assignee: TOSHIBA LIFESTYLE PRODUCTS & SERVICES CORPORATION, Kawasaki (JP)

(*) Notice: Subject to any disclaimer, the term of this patent is extended or adjusted under 35 U.S.C. 154(b) by 445 days.

(21) Appl. No.: 16/545,841

(22) Filed: Aug. 20, 2019

(65) Prior Publication Data
US 2020/0069136 A1 Mar. 5, 2020

(30) Foreign Application Priority Data
Sep. 4, 2018 (JP) .............................. JP2018-165299

(51) Int. Cl.
A47L 11/30 (2006.01)
A47L 11/40 (2006.01)
C02F 1/461 (2006.01)

(52) U.S. Cl.
CPC ........... *A47L 11/30* (2013.01); *A47L 11/4011* (2013.01); *A47L 11/4044* (2013.01);
(Continued)

(58) Field of Classification Search
CPC .. A47L 11/30; A47L 11/4011; A47L 11/4044; A47L 11/4083; A47L 2201/026;
(Continued)

(56) References Cited
U.S. PATENT DOCUMENTS 9,162,904 B2 * 10/2015 Guastella .............. C02F 1/4618
2007/0187262 A1 * 8/2007 Field ................... A47L 11/4083
205/742

(Continued)

FOREIGN PATENT DOCUMENTS

CN 203034105 U 7/2013
CN 203693500 U 7/2014
(Continued)

Primary Examiner — David Redding
(74) Attorney, Agent, or Firm — Oblon, McClelland, Maier & Neustadt, L.L.P.

(57) ABSTRACT

To provide an electric cleaning apparatus including a vacuum cleaner that loads an appropriate amount of electrolyzed water and does not reduce convenience in terms of power consumption and lightness. An electric cleaning apparatus includes a vacuum cleaner and a station. The vacuum cleaner comprises: a first reservoir configured to store electrolyzed water; and a first cleaner configured to clean a surface to be cleaned by using the electrolyzed water supplied from the first reservoir. The station comprises: a second reservoir configured to store water; an electrolyzed-water generator that generates the electrolyzed water by electrolyzing the water; and a supply system configured to supply the first reservoir with the electrolyzed water generated with the electrolyzed-water generator when the vacuum cleaner is connected to the station.

19 Claims, 8 Drawing Sheets

(52) U.S. Cl.
CPC ....... *A47L 11/4083* (2013.01); *C02F 1/46104* (2013.01); *A47L 2201/026* (2013.01); *C02F 2201/461* (2013.01)

(58) Field of Classification Search
CPC ...... A47L 11/40; A47L 2201/028; A47L 9/28; A47L 9/00; A47L 9/02; A47L 9/04; A47L 9/0411; A47L 9/2805; A47L 9/2873; A47L 9/2884; C02F 1/46104; C02F 2201/461; C02F 1/4618; C02F 2001/46185; C02F 2307/12
See application file for complete search history.

(56) References Cited

U.S. PATENT DOCUMENTS

| | | | | |
|---|---|---|---|---|
| 2008/0134459 | A1* | 6/2008 | Chugun | A47L 11/30 15/320 |
| 2014/0001054 | A1* | 1/2014 | Longhenry | A47L 11/4083 205/464 |
| 2014/0165324 | A1 | 6/2014 | Luo et al. | |
| 2016/0066760 | A1* | 3/2016 | Citsay | C25B 15/08 134/6 |
| 2017/0049288 | A1* | 2/2017 | Knutson | A47L 11/4088 |
| 2019/0069749 | A1* | 3/2019 | Wurm | A47L 11/4083 |
| 2021/0177228 | A1* | 6/2021 | Windmeisser | A47L 11/40 |

FOREIGN PATENT DOCUMENTS

| | | |
|---|---|---|
| CN | 104337469 A | 2/2015 |
| CN | 204445700 U | 7/2015 |
| DE | 20 2016 104 067 U1 | 12/2017 |
| JP | 2005-211426 A | 8/2005 |
| JP | 2006-158814 A | 6/2006 |
| JP | 2007-069983 A | 3/2007 |
| JP | 2007-513659 A | 5/2007 |
| JP | 2012-29803 A | 2/2012 |
| JP | 2014-232795 A | 12/2014 |
| JP | 2016-36725 A | 3/2016 |
| JP | 2016-87547 A | 5/2016 |
| JP | 2018-027295 A | 2/2018 |
| JP | 2018-027797 A | 2/2018 |
| JP | 2018-082732 A | 5/2018 |

\* cited by examiner

ELECTRIC CLEANING APPARATUS, STATION, AND VACUUM CLEANER

CROSS-REFERENCE TO RELATED APPLICATIONS

This application claims the benefit of priority of Japanese Patent Application No. 2018-165299, filed on Sep. 4, 2018, the entire contents of which are incorporated herein by reference.

FIELD

The present invention relates to a vacuum cleaner, a station for charging the vacuum cleaner, and an electric cleaning apparatus that include the vacuum cleaner and the station.

BACKGROUND

A known self-propelled cleaner includes: a cleaner provided with a wiping tool; and a station to which the cleaner body returns. The station includes a cleaning tank for storing germicidal metal ion water as cleaning liquid. The cleaner returned to the station cleans the wiping tool by immersing the wiping tool in the cleaning liquid stored in the cleaning tank. (Refer to JP 2005-211426 A, for example.)

Among various types of aqueous solution that has acquired a useful function by artificial processing, functional water is known as an aqueous solution, scientific basis of which has been clarified or is to be clarified in terms of processing and function. Electrolyzed water is known as one example of functional water. Electrolyzed water is produced by electrolyzing tap water or an aqueous solution containing chloride ions (Cl—) such as sodium chloride (NaCl) with a direct current voltage. The electrolyzed water is, for example, bactericidal electrolyzed water used for hygiene management. The bactericidal electrolyzed water is, for example, acidic electrolyzed water, electrolytic hypochlorous water regarded as a sodium-hypochlorite diluted-solution, or electrolytic ozone water.

In order to use electrolyzed water for cleaning with the vacuum cleaner, bactericidal electrolyzed water must be produced and transported together with the vacuum cleaner. However, when an electrolyzed-water generator for generating electrolyzed water is mounted to a vacuum cleaner, the weight of the vacuum cleaner increases and the power consumption of the vacuum cleaner increases. In this case, there is a possibility that the convenience of the vacuum cleaner is impaired. For example, weight reduction of the vacuum cleaner may be hindered, making the vacuum cleaner cordless that operates with a built-in battery may be hindered, and the operating time of the built-in battery may be shortened.

When electrolyzed water and water for generating the electrolyzed water are reserved in the vacuum cleaner more than necessary, the weight of the vacuum cleaner further increase, and the disadvantages in the event of a water leak are increase.

SUMMARY OF THE INVENTION

To solve the problem described above, it is an object of the present invention to provide a vacuum cleaner that loads an appropriate amount of electrolyzed water and does not reduce convenience in terms of power consumption and lightness; a station for charging this vacuum cleaner; and an electric cleaning apparatus included this vacuum cleaner and this station.

To achieve the above object, an electric cleaning apparatus includes: an electric cleaning apparatus comprising a vacuum cleaner and a station that can be connected to and disconnected from the vacuum cleaner. The vacuum cleaner comprises: a first reservoir configured to store electrolyzed water; and a first cleaner configured to clean a surface to be cleaned by using the electrolyzed water supplied from the first reservoir. The station comprises: a second reservoir configured to store water; an electrolyzed-water generator that generates the electrolyzed water by electrolyzing the water; and a supply system configured to supply the first reservoir with the electrolyzed water generated with the electrolyzed-water generator when the vacuum cleaner is connected to the station.

Further, to achieve the above object, a station connectable to and disconnectable from a vacuum cleaner that includes a first reservoir configured to store electrolyzed water and a first cleaner configured to clean a surface to be cleaned by using the electrolyzed water supplied from the first reservoir. The station comprising: a second reservoir configured to store water; an electrolyzed-water generator configured to generate the electrolyzed water by electrolyzing the water in the second reservoir; and a supply system configured to supply the first reservoir with the electrolyzed water generated with the electrolyzed-water generator when the vacuum cleaner is connected to the station.

Furthermore, to achieve the above object, a vacuum cleaner connectable to and disconnectable from a station that includes: a second reservoir configured to store water; an electrolyzed-water generator configured to generate electrolyzed water by electrolyzing the water in the second reservoir; and a supply system configured to supply the electrolyzed water generated with the electrolyzed-water generator. The vacuum cleaner comprising: a first reservoir configured to store a smaller amount of the electrolyzed water than full amount of the water to be stored in the second reservoir and store the electrolyzed water that is generated with the electrolyzed-water generator and is supplied through the supply system; and a first cleaner configured to clean a surface to be cleaned by using the electrolyzed water supplied from the first reservoir.

DETAILED DESCRIPTION

A description will now be given of embodiments of electric cleaning apparatuses, stations, and vacuum cleaners according to the present invention by referring to FIG. 1 to FIG. 8. The same reference signs are given for identical or equivalent components in each figure.

Figure 1:
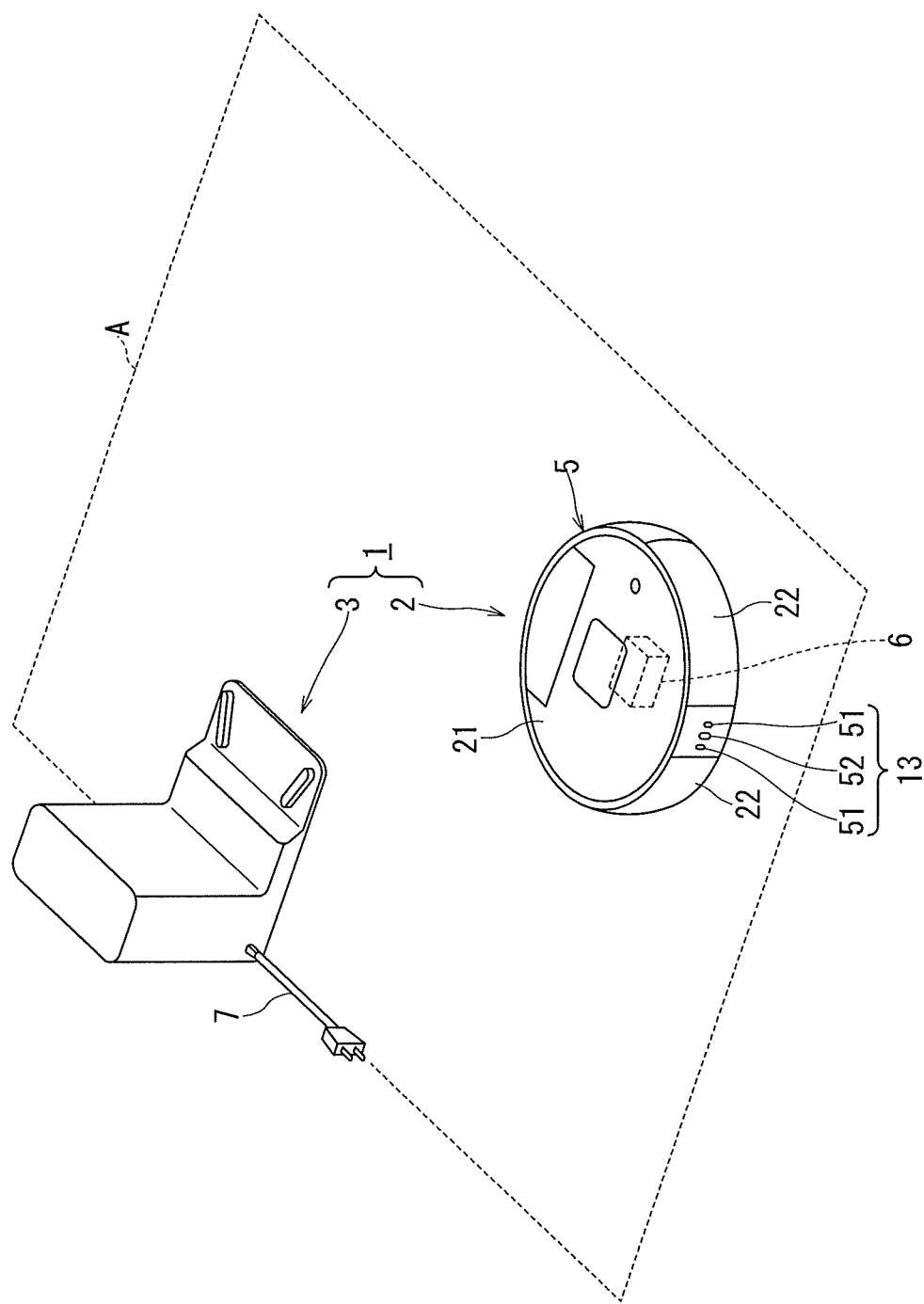
FIG. 1 is a perspective view of an electric cleaning apparatus according to one embodiment of the present invention.

FIG. 1 is a perspective view of an electric cleaning apparatus according to one embodiment of the present invention.

As shown in FIG. 1, the electric cleaning apparatus 1 according to the embodiment of the present invention includes a vacuum cleaner 2 and a station 3 that is connectable to and disconnectable, for example, detachable from the vacuum cleaner 2.

The vacuum cleaner 2 is a so-called robot cleaner, for example, autonomous cleaner. The vacuum cleaner 2 autonomously moves, for example, autonomously runs by consuming power of a rechargeable battery 6 mounted on the cleaner body 5. The vacuum cleaner 2 moves around the surface to be cleaned in the cleaning target area A in the living room, i.e., moves around a floor surface so as to wipe and clean the floor surface. In detail, the vacuum cleaner 2 wipes the cleaning target area A by moving comprehensively into the cleaning target area A. After the cleaning operation, the vacuum cleaner 2 returns to station 3 and waits for the next cleaning operation.

The vacuum cleaner 2 may be a non-autonomous type that is connected to and stored in the station 3, as exemplified by a canister type, an upright type, a stick type, and a handy type.

The station 3 is installable on the surface to be cleaned in the living room. The station 3 is smoothly connectable to and disconnectable from the vacuum cleaner 2. The station 3 has a so-called charging stand function. The station 3 is provided with a power cord 7 for conducting power from a commercial alternating current (AC) power supply to the rechargeable battery 6 when the vacuum cleaner 2 connected to the station 3. The power cord 7 is an electric path for transmitting power from the commercial AC power supply to the rechargeable battery 6.

The vacuum cleaner 2 having returned to the station 3 charges the rechargeable battery 6 while waiting for the next cleaning operation. Thus, the vacuum cleaner 2 eliminates the inconvenience of manual operation for charging and allows the sudden cleaning requested by the user.

Figure 2:
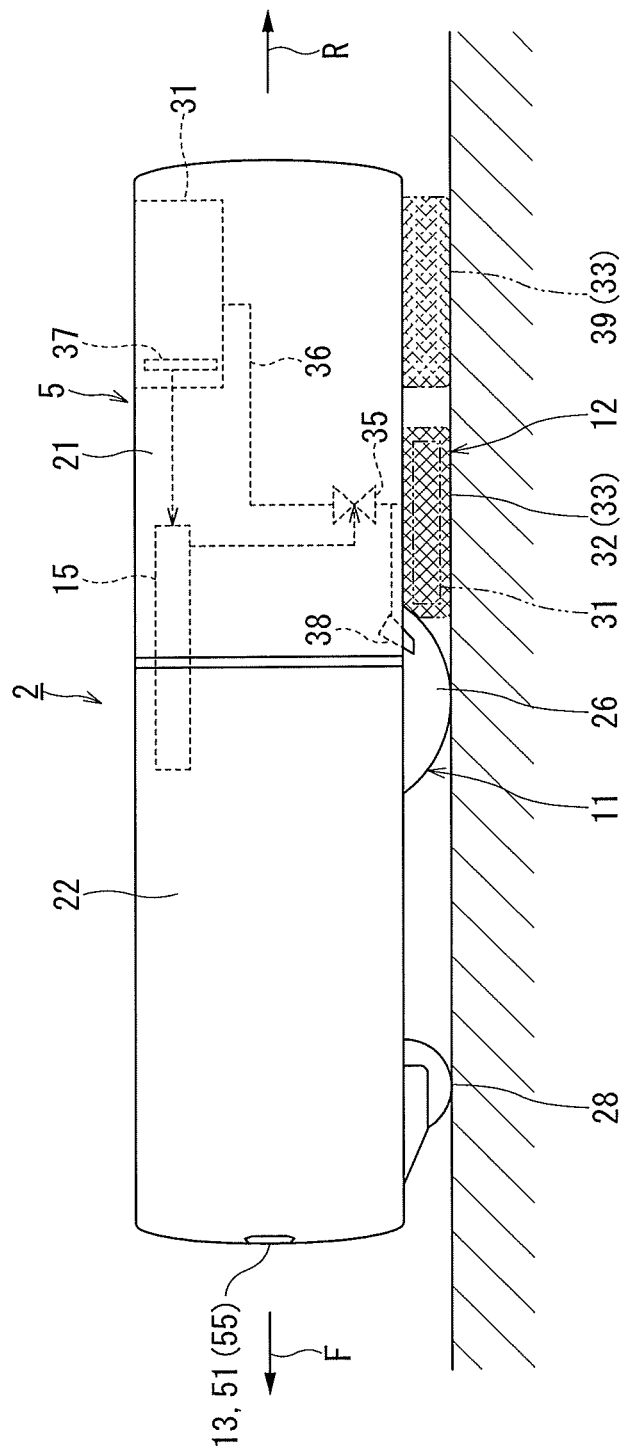
FIG. 2 is a right side view of a vacuum cleaner included in the electric cleaning apparatus according to the embodiment of the present invention.

FIG. 2 is a right side view of the vacuum cleaner.

Figure 3:
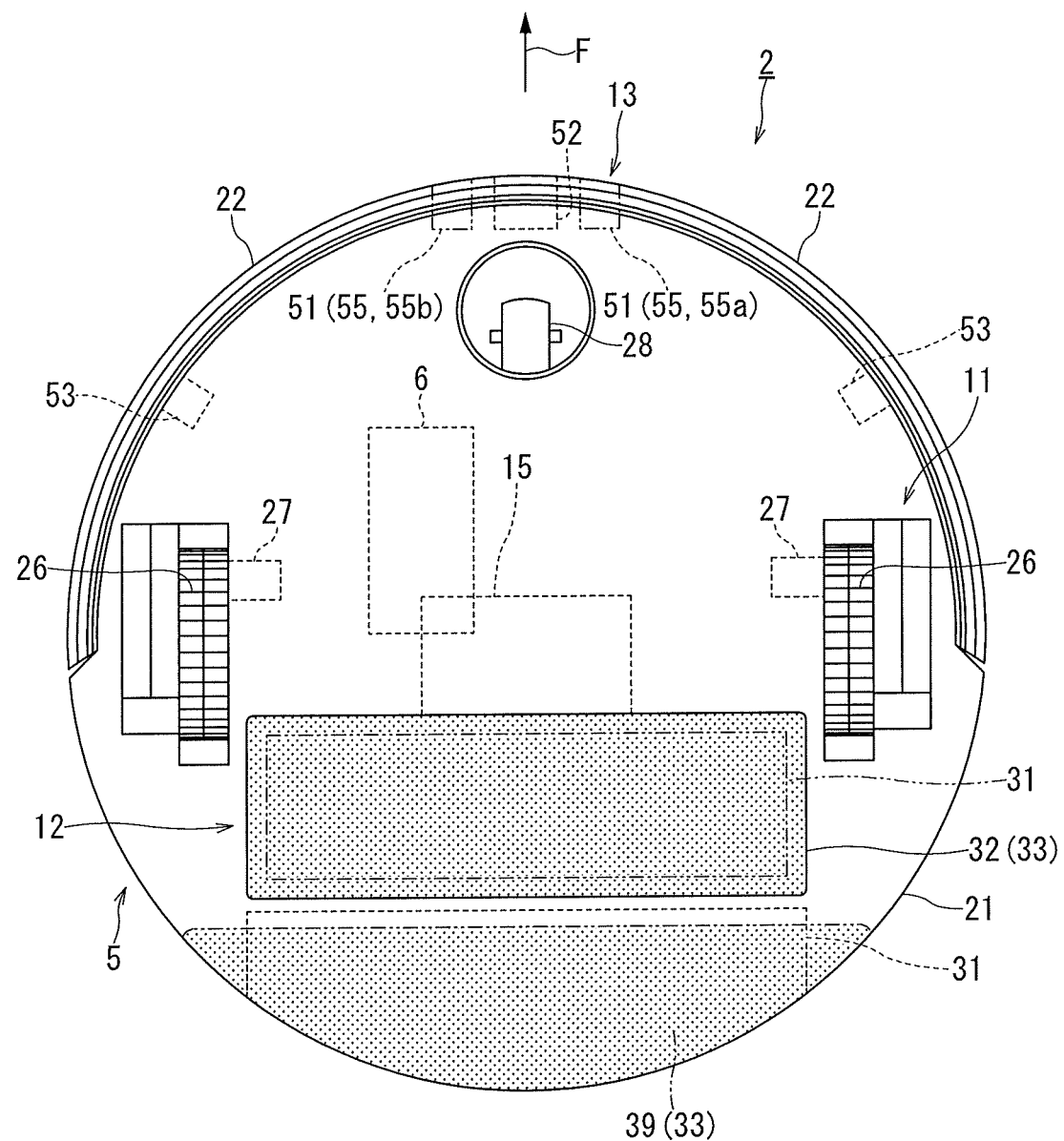
FIG. 3 is a bottom view of the vacuum cleaner according to the embodiment of the present invention.

FIG. 3 is a bottom view of the vacuum cleaner.

As shown in FIG. 1 to FIG. 3, the vacuum cleaner 2 of the electric cleaning apparatus 1 according to the embodiment of the present invention includes: a cleaner body 5; a moving unit 11 for moving the cleaner body 5; a cleaning unit 12 for cleaning the surface to be cleaned below the cleaner body 5; a detector 13 for detecting an object O around the cleaner body 5; a controller 15 for controlling the operation of the vacuum cleaner 2 by controlling the detector 13, the moving unit 11, and cleaning unit 12; and a rechargeable battery 6 that supplies power to the respective components of the vacuum cleaner 2 including the moving unit 11, the cleaning unit 12, the detector 13, and the controller 15.

For example, the cleaner body 5 includes a body housing 21 made of a synthetic resin, and a bumper 22 that is mounted on the side face of the body housing 21.

The body housing 21 is an outer shell of the cleaner body 5. The body housing 21 has a flat cylindrical shape, for example a disk shape, and is substantially circular in plan view. Such body housing 21 allows reducing the turning radius as compared with other shapes.

The bumper 22 is mounted on the side face of the body housing 21.

The moving unit 11 is provided with driving wheels 26, motors 27 configured to drive the respective driving wheels 26 individually, and a driven wheel 28 configured to support the cleaner body 5 on the surface to be cleaned together with the driving wheels 26.

The respective drive wheels 26 transmit the force for moving the cleaner body 5 to the surface to be cleaned. The respective drive wheels 26 rotate around the axle extending in the width direction or right-left direction of the cleaner body 5. The driving wheels 26 includes at least one pair of driving wheels 26. The axles of the pair of driving wheels 26 are positioned substantially on the same straight line. Thus, the vacuum cleaner 2 allows readily going straight and turning. The driving wheels 26 are held against the surface to be cleaned by a so-called suspension. The vacuum cleaner 2 may be provided with continuous tracks instead of the driving wheels 26.

For example, the number of the motors 27 are the same as the number of the driving wheels 26 such that each motor 27 corresponds to one driving wheel 26 and each of the motors 27 independently drives the corresponding driving wheels 26. The vacuum cleaner 2 goes straight by rotating the right and left driving wheels 26 in the same direction, and turns by rotating the right and left driving wheels 26 in the opposite directions. Going straight includes moving forward and moving backward. The turning includes clockwise turning and counter-clockwise turning. The vacuum cleaner 2 allows adjusting the forward or backward speed by raising or lowering the outputs of the right and left driving wheels 26, and allows adjusting the turning radius by making the respective outputs of the right and left driving wheels 26 different.

In the front of the cleaner body 5, the driven wheel 28 is disposed at a substantially central portion in the width direction of the bottom of the cleaner body 5. The driven wheel 28 is a circular rotating body, for example, a caster. The driven wheel 28 turns by quickly following the forward movement, backward movement, and turning of the vacuum cleaner 2 so as to stabilize the running of the vacuum cleaner 2. It is preferred that the center of gravity of the vacuum cleaner 2 supported by the pair of driving wheels 26 and the driven wheel 28 is disposed inside the triangle that is formed by the pair of driving wheels 26 and the driven wheel 28. In this case, the risk that the vacuum cleaner 2 falls is reduced. In other words, the vacuum cleaner 2 can move more stably. The driven wheel 28 may be omitted.

The cleaning unit 12 cleans the dust on the surface to be cleaned right under the cleaner body 5. The cleaning unit 12 includes: a first reservoir 31 that stores electrolyzed water; and a first cleaner 32 that cleans the surface to be cleaned by using the electrolyzed water supplied from the first reservoir 31.

The first cleaner 32 wipes or polishes the floor surface under the cleaner body 5, for example. The first cleaner 32 is provided with a wiping cleaning sheet 33 made of a fiber material such as a non-woven fabric that is attachable to and detachable from the bottom face of the cleaner body 5. When wet with electrolyzed water supplied from the first reservoir 31, the wiping cleaning sheet 33 allows wiping on the surface to be cleaned with electrolyzed water. The wiping cleaning sheet 33 is disposed at the rear end of the bottom of the cleaner body 5. The wiping cleaning sheet 33 contacts the surface to be cleaned when the vacuum cleaner 2 is placed on the surface to be cleaned in the state of being runnable. The wiping cleaning sheet 33 is preferably pressed against the surface to be cleaned with an appropriate pressure such that the driving wheels 26 can not slip on the surface to be cleaned. Between the wiping cleaning sheet 33 and the bottom face of the cleaner body 5, an elastic member such as a foamed resin is provided. This elastic member presses the wiping cleaning sheet 33 against the surface to be cleaned with uniform pressure.

The first reservoir 31 is a container provided with the cleaner body 5 for storing electrolyzed water. The first reservoir 31 may be the first cleaner 32 having water absorbency (the first reservoir 31 shown by the two-dot chain line in FIG. 3). For example, the first reservoir 31 may be a member made of superabsorbent polymer (SAP, so-called absorbent polymer, super absorbent resin, or polymeric absorbent) integrated with the wiping cleaning sheet 33.

The first cleaner 32 may be provided with an adjustment mechanism 35 for adjusting the amount of electrolyzed water supplied from the first reservoir 31 to the wiping cleaning sheet 33, for example, an electromagnetic adjustment valve, and a supply pipe 36 that connects the first reservoir 31 to the wiping cleaning sheet 33 so as to lead the electrolyzed water. The adjustment mechanism 35 is provided in the middle of the supply pipe 36.

The first cleaner 32 may be provided with a remaining amount detector 37 that detects the remaining amount of the electrolyzed water in the first reservoir 31. The remaining amount detector 37 is, for example, a water gauge that detects the water level of the first reservoir 31.

Instead of or in addition to the first cleaner 32, the cleaning unit 12 may be provided with a nozzle 38 that sprays or spreads the electrolyzed water supplied from the first reservoir 31 to the surface to be cleaned. The electrolyzed water sprayed or spread from the nozzle 38 may be at normal temperature or may be vapor vaporized with a heater.

The cleaning unit 12 may further include a second cleaner 39 that is provided behind the first cleaner 32 and allows wiping on the surface to be cleaned without electrolyzed water. The second cleaner 39 is also provided with the wiping cleaning sheet 33 made of a fiber material such as a non-woven fabric that is attachable to and detachable from the bottom of the cleaner body 5, similarly to the first cleaner 32. The wiping cleaning sheet 33 of the second cleaner 39 contacts the surface to be cleaned when the vacuum cleaner 2 is placed on the surface to be cleaned in the state of being runnable. The wiping cleaning sheet 33 of the second cleaner 39 is preferably pressed against the surface to be cleaned with an appropriate pressure such that the driving wheels 26 can not slip on the surface to be cleaned. Between the wiping cleaning sheet 33 of the second cleaner 39 and the bottom face of the cleaner body 5, an elastic member such as a foamed resin is provided. This elastic member presses the wiping cleaning sheet 33 against the surface to be cleaned with uniform pressure.

The cleaning unit 12 may be further provided with a suction cleaner that generates negative pressure so as to suck in dust. The suction cleaner includes a suction port provided on the bottom face of the cleaner body 5, a rotating brush disposed at the suction port, a brush motor for rotating the rotating brush, a dust container disposed at the rear of the cleaner body 5, and an electric blower that is housed in the cleaner body 5 and fluidly connected to the dust container.

The suction port sucks dust together with air by negative pressure generated with the electric blower. The suction port is disposed in front of the first cleaner 32 and in the central portion of the bottom of the cleaner body 5. The suction port extends in the width direction of the cleaner body 5. In other words, the opening width in the width direction or right-left direction of the suction port is larger than the opening width in the front-rear direction of the suction port. Since the bottom face of the cleaner body 5 faces the surface to be cleaned during autonomous running, the suction port can readily suck in the dust on the surface to be cleaned or the dust scraped by the rotating brush from the surface to be cleaned.

The centerline of rotation of the rotating brush is oriented in the width direction of vacuum cleaner 2. The rotating brush contacts the surface to be cleaned when the vacuum cleaner 2 is placed on the surface to be cleaned in the state of being runnable. Thus, the rotating brush being rotationally driven scrapes the dust on the surface to be cleaned. The scraped dust is efficiently sucked into the suction port.

The brush motor rotates the rotating brush in the normal direction or in the reverse direction. The direction of the normal rotation of the rotating brush is the rotation direction that assists the forward movement of the vacuum cleaner 2. The reverse direction of the rotating brush is the rotation direction that assists the backward movement of the vacuum cleaner 2.

The dust container accumulates dust to be sucked from the suction port by suction vacuum pressure that is generated with the electric blower. The dust container is a separation device that separates dust from air containing dust by a separation method. The separation method includes a filter for filtering and collecting dust, and inertial separation method such as centrifugal separation (cyclone separation) and straight-flow type separation (a method of separating dust and air by the difference in inertia force between the air and the dust flowing straight). The dust container is attachable to and detachable from the cleaner body 5, and openable and closable. A user temporarily opens the dust container by detaching the dust container from the cleaner body 5, and thereby the user readily discards the dust accumulated in the dust container and cleans the dust container by wiping, polishing, and/or washing it.

The electric blower consumes the power of the rechargeable battery 6 to operate. The electric blower sucks in air from the dust container to generate suction vacuum pressure. The negative pressure generated in the dust container acts on the suction port. The cleaner body 5 has an exhaust port (not shown) for allowing the exhaust of the electric blower (i.e., the clean air) to flow out of the cleaner body 5.

The detector 13 detects an object O approaching the cleaner body 5 as the cleaner body 5 moves or detects another object O contacting the cleaner body 5. The detector 13 includes: a camera 51 provided with cleaner body 5 and configured to image the surroundings of the vacuum cleaner 2; a proximity detector 52 provided with the cleaner body 5 and configured to detect that the cleaner body 5 has approached an object other than the vacuum cleaner 2, i.e., an object O; and a contact detector 53 provided with the cleaner body 5 and configured to detect that the cleaner body 5 contacts an object other than the vacuum cleaner 2, i.e., the object O.

The camera 51 is provided in front of the cleaner body 5 and images the front of the vacuum cleaner 2, i.e., images a view in the traveling direction when the vacuum cleaner moves forward.

Instead of or in addition to the camera 51, the vacuum cleaner 2 may include a distance measurement device 55 that acquires depth information in the imaging range by using a principle different from that of a stereo camera.

The proximity detector 52 is, for example, at least one of an infrared sensor and an ultrasonic sensor. The proximity detector 52 using an infrared sensor includes a light emitting element configured to emit infrared light and a light receiving element that receives the light and converts it into an electrical signal. In detail, the proximity detector 52 emits infrared light from the light emitting element, receives the infrared light reflected on the object O by the light receiving element, and converts the received infrared light into electric power. When the converted electric power exceeds a predetermined level, before the cleaner body 5 contacts the object O, the proximity detector 52 detects that the object O has approached within a predetermined distance. The proximity detector 52 using an ultrasonic sensor detects the object O by using ultrasonic waves instead of infrared light.

The contact detector 53 is a so-called bumper sensor. The contact detector 53 detects the movement of the bumper 22 that reduces the impact on the cleaner body 5 when the moving cleaner body 5 contacts the object O. When the bumper 22 contacts the object O, the bumper 22 is displaced so as to be pushed toward the interior of the cleaner body 5. The contact detector 53 detects the displacement of the bumper 22, and thereby detects that the cleaner body 5 contacts the object O. The contact detector 53 includes, for example, a micro switch configured to be turned on or turned off in response to the displacement of the bumper 22. Additionally or alternatively, the contact detector 53 may include at least one of an infrared sensor and an ultrasonic sensor, each of which measures the displacement amount of the bumper 22 in a noncontact manner.

The rechargeable battery 6 stores electric power to be consumed by the respective components of the vacuum cleaner 2 including the moving unit 11, the cleaning unit 12, the detector 13, and the controller 15. The rechargeable battery 6 is, for example, a lithium ion battery, and has a control circuit configured to control its charging and discharging. This control circuit outputs information on charging and discharging of the rechargeable battery 6 to the controller 15.

Figure 4:
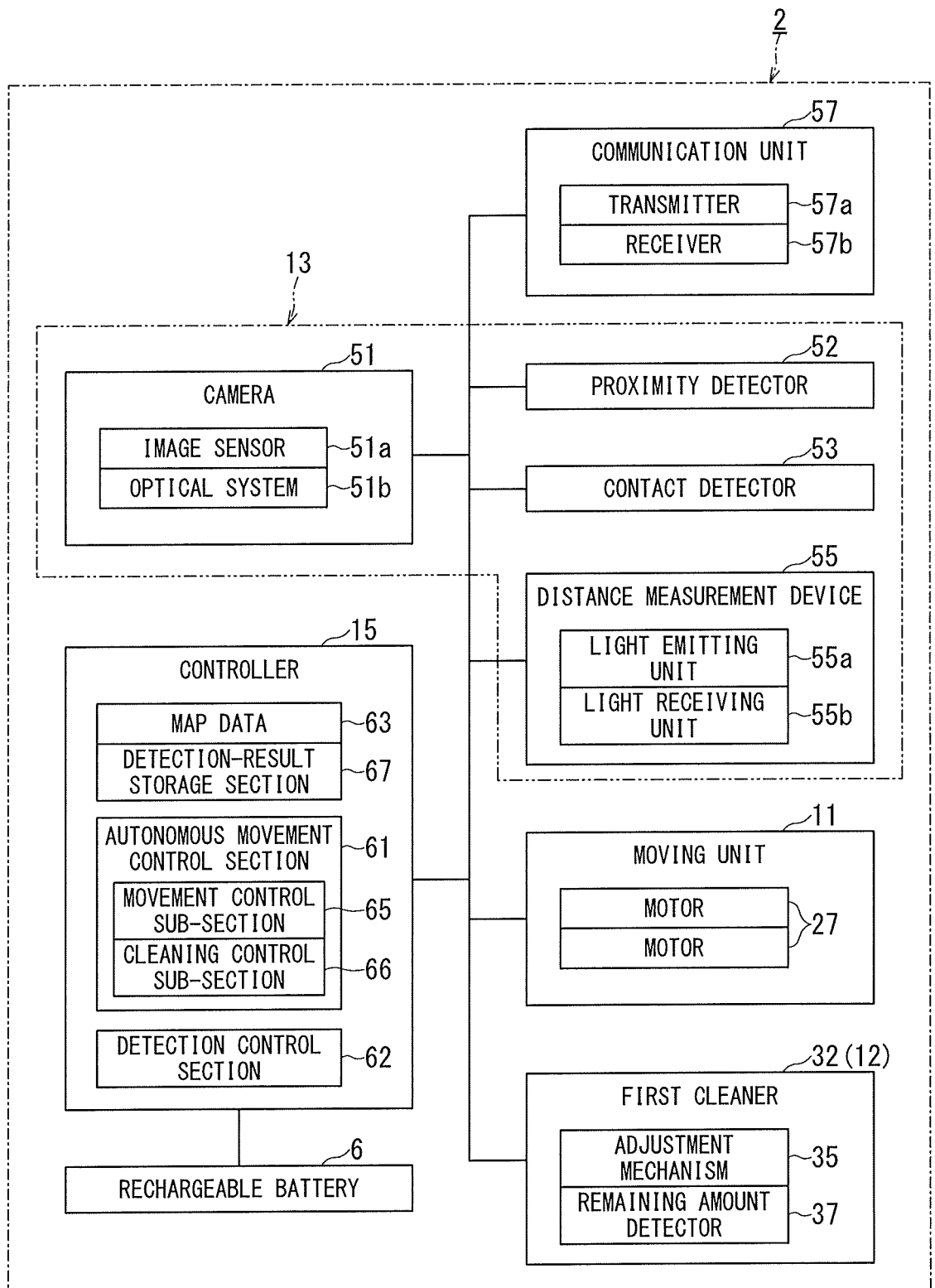
FIG. 4 is a block diagram of the vacuum cleaner according to the embodiment of the present invention.

FIG. 4 is a block diagram of the vacuum cleaner.

As shown in FIG. 2 to FIG. 4, the vacuum cleaner 2 of the electric cleaning apparatus 1 according to the embodiment of the present invention includes a communication unit 57 in addition to the motor 27 of the moving unit 11, the adjustment mechanism 35 of the first cleaner 32, the brush motor and the electric blower of the suction cleaner, the detector 13, the controller 15, and the rechargeable battery 6.

The communication unit 57 includes a transmitter 57a configured to transmit an infrared signal to the station 3, and a receiver 57b configured to receive an infrared signal that is transmitted from the station 3 or a remote controller. The transmitter 57a includes, for example, an infrared light emitting element. The receiver 57b includes, for example, a phototransistor.

The camera 51 of the detector 13 is, for example, a digital camera. In detail, the camera 51 includes at least one image sensor 51a for converting light being made incident on the respective pixels into electrical signals, and an optical system 51b configured to form an optical image of the object on the entire surface of those pixels of image sensor 51a. The image sensor 51a is, for example, a Charge-Coupled Device (CCD) image sensor or a Complementary Metal-Oxide-Semiconductor image sensor (CMOS) image sensor. Thus, the vacuum cleaner 2 allows using digital data of the images imaged with the camera 51 immediately. For example, an image processing circuit may be used for processing the images imaged with the camera 51, and thereby the images imaged with the camera 5 allows being compressed to a predetermined data format, converted into binary images, or converted into grayscale images. In terms of wavelength, the camera 51 generates an image of, for example, a visible light region. An image in the visible light region is more satisfactory in terms of image quality than, for example, an image in the infrared region, and provide visible information to a user without being subjected to complicated image processing.

The camera 51 is a so-called stereo camera. For example, the two image sensors 51a of the camera 51 are disposed apart in the width direction of the vacuum cleaner 2 such that the camera 51 generates parallax data from difference between the respective images generated with both image sensors and measures the distance between the camera 51 and the object on the basis of the parallax data. Thus, the imaging range of one image sensor 51a and the imaging range of the other image sensor 51a partially overlap so as to commonly include the front in the front-rear direction (or the direction orthogonal to the width direction) of the vacuum cleaner 2. The camera 51 allows acquire information on the depth in the imaging range, i.e., information on the distance viewed from the vacuum cleaner 2. The image having information on the depth is called a distance image.

The camera 51 may be provided with a lighting device such as a light emitting diode (LED) and a light bulb. The lighting device illuminates part or all of the imaging range of the camera 51. The illumination device enables the camera 51 to generate satisfactory images even under a dark environment, for example, during a night time or in a shadow of an obstacle (object O) such as furniture.

A large number of pixels are arrayed on the light receiving surface of the image sensor 51a. Each pixel of the light receiving surface converts the received light into an electrical signal. An image of a scene to be observed with the camera 51 allows being acquired by integrating information of light received by the respective pixels in accordance with the positions of the respective pixels. In general, the image sensor 51a generates a color image. A color image is expressed by mixing, for example, three colors of red, green, and blue.

The distance measurement device 55 includes: a light emitting unit 55a configured to emit light in a range for which depth information is to be obtained or required; and a light receiving unit 55b that receives reflected light of the light emitted from the light emitting unit 55a. The vacuum cleaner 2 acquires information on distance from the vacuum cleaner 2 to the object O on the basis of time difference between the start timing of light emission from the light emitting unit 55a and the reception timing of the reflected light by the light receiving unit 55b. The light emitting unit 55a emits, for example, infrared light or visible light.

The controller 15 includes, for example, a central processing unit (CPU), an auxiliary memory, for example, read only memory (ROM), for storing parameters and various calculation programs to be executed or processed by the central processing unit, and a main memory, for example, random access memory (RAM), in which the work area of the programs is dynamically secured. The auxiliary memory is preferably rewritable, for example, as a non-volatile memory.

The controller 15 is electrically connected to the motor 27 of the moving unit 11, the adjustment mechanism 35 of the first cleaner 32, the brush motor and the electric blower of the suction cleaner, the detector 13, the rechargeable battery 6, and the communication unit 57. The controller 15 controls the motor 27 of the moving unit 11, the adjustment mechanism 35 of the first cleaner 32, the brush motor and electric blower of the suction cleaner, the detector 13, and the rechargeable battery 6 in response to the command received from the station 3 or the remote controller via the communication unit 57.

The controller 15 includes an autonomous movement control section 61 for controlling the autonomous movement of the vacuum cleaner 2 and a detection control section 62 for controlling the operation of the detector 13. For example, each of the autonomous movement control section 61 and the detection control section 62 is an execution region of the corresponding calculation program in the controller 15.

The controller 15 includes a memory region in which map data 63 are stored as an environment map information of the place to be cleaned. The autonomous movement control section 61 includes: a movement control sub-section 65 for controlling the operation of the motor 27 of the moving unit 11; and a cleaning control sub-section 66 for controlling the operation of the adjustment mechanism 35 of the first cleaner 32, the brush motor, and electric blower of the suction cleaner.

The map data 63 are a set of data constructed in the memory region secured in the auxiliary memory, and has an appropriate data structure. The map data 63 are read out from the auxiliary memory to the main memory and are used. The map data 63 are overwritten on the auxiliary memory after appropriate updating.

The environmental map information (i.e., map data 63) is information used for autonomous movement of the vacuum cleaner 2, and is information including the shape of the region where the vacuum cleaner 2 can move at least in the place to be cleaned. The environmental map information is constructed as, for example, a set of regularly arrayed rectangles of 10 centimeter on a side. The environmental map information may be prepared in advance in the case of using the vacuum cleaner 2 or may be generated by Simultaneous Localization and Mapping (SLAM) simultaneously with the self-location estimation. The environmental map information may be generated and updated in the process of movement associated with the cleaning operation. When the environmental map information is generated by SLAM, it is preferred that the vacuum cleaner 2 includes various sensors such as an encoder in addition to the detector 13. The movement control sub-section 65 generates the environmental map information on the basis of the information acquired from the detector 13 and the various sensors.

The movement control sub-section 65 controls the moving unit 11 on the basis of on the environmental map information so as to cause the vacuum cleaner 2 to autonomously move. The movement control sub-section 65 controls the magnitude and the direction of the current flowing to the motor 27 so as to rotate the motor 27 in the normal direction or in the reverse direction. The movement control sub-section 65 controls the driving of the driving wheels 26 by rotating the motor 27 in the normal direction or in the reverse direction.

The cleaning control sub-section 66 controls the adjustment mechanism 35 of the first cleaner 32 so as to control the amount of electrolyzed water to be supplied from the first reservoir 31 to the wiping cleaning sheet 33.

The cleaning control sub-section 66 calculates required amount of electrolyzed water to be supplied from the station 3 to the first reservoir 31 on the basis of the remaining amount of electrolyzed water in the first reservoir 31 detected by the remaining amount detector 37. The cleaning control sub-section 66 stores the calculated amount of electrolyzed water to be used in one cleaning operation in the memory on the basis of the remaining amount of electrolyzed water in the first reservoir 31 detected by the remaining amount detector 37. The amount of electrolyzed water to be used in one cleaning operation is, for example, the amount of electrolyzed water to be consumed after the vacuum cleaner 2 is disconnected from the station 3 and before the vacuum cleaner 2 is connected to the station 3 again. The cleaning control sub-section 66 analyzes the history of consumption of electrolyzed water per cleaning operation by a statistical method and uses this analysis result for calculating the required amount of electrolyzed water to be supplied from the station 3 to the first reservoir 31. Specifically, when consumption of electrolyzed water per cleaning operation is expected to correspond to 50 percent of the full or maximum amount of stored electrolyzed water as the result of the statistic analysis, the cleaning control sub-section 66 calculates the required amount of electrolyzed water to be added to the first reservoir 31 by adding a few percent margin to 50 percent of the full amount (i.e., 50 percent of the capacity). The required amount of electrolyzed water calculated in the above manner is transmitted to the station 3 via the communication unit 57.

The detection control section 62 controls the operation of the camera 51. The detection control section 62 causes the camera 51 to image the imaging range at predetermined time intervals. The detection control section 62 stores the images generated with the camera 51 in the detection-result storage section 67. The detection-result storage section 67 is a memory region secured in the controller 15. The detection-result storage section 67 has a capacity capable of storing a large number of images.

The detection-result storage section 67 may store image information representing images generated with the camera 51 without performing any processing on these images or may store image information obtained by compressing the data size within the range in which information necessary for the image analysis processing remains. The image information to be stored in the detection-result storage section 67 may be, for example, grayscale images obtained by converting original images generated with the camera 51 into grayscale images (hereinafter, simply referred to as images, similarly to the original image generated with the camera 51). In the case of a grayscale image, the pixel value of each pixel in the image matches the luminance value of each pixel. In the case of storing images converted into grayscale, the controller 15 reduces the capacity (resource) of the memory region allocated to the detection-result storage section 67, as compared with the case of storing the original images. When the images converted into grayscale are used for the subsequent analysis processing, the controller 15 reduces the load on the central processing unit as compared with the case of processing the original images. Image processing including the grayscale processing may be performed by the camera 51. When image processing is performed by the camera 51, the load on the central processing unit is reduced.

Additionally, the detection control section 62 controls lighting and extinguishing of the lighting device. The lighting device brightens each image so as to facilitate the analysis processing and enhances the accuracy of the analysis processing.

Further, the detection control section 62 stores the detection result of the proximity detector 52 in the detection-result storage section 67. The detection result of the proximity detector 52 is the fact that the object O approaches the cleaner body 5 and the distance between the object O and the cleaner body 5 at that time.

Moreover, the detection control section 62 stores the detection result of the contact detector 53 (i.e., the fact that the detection object O contacts the cleaner body 5) in the detection-result storage section 67.

Next, a description will be given of embodiments or aspects of the stations (3, 3A, 3B, and 3C) in detail. In the description of the stations 3A, 3B, and 3C, the same reference signs are assigned to the same components as the station 3 and duplicate description is omitted.

Figure 5:
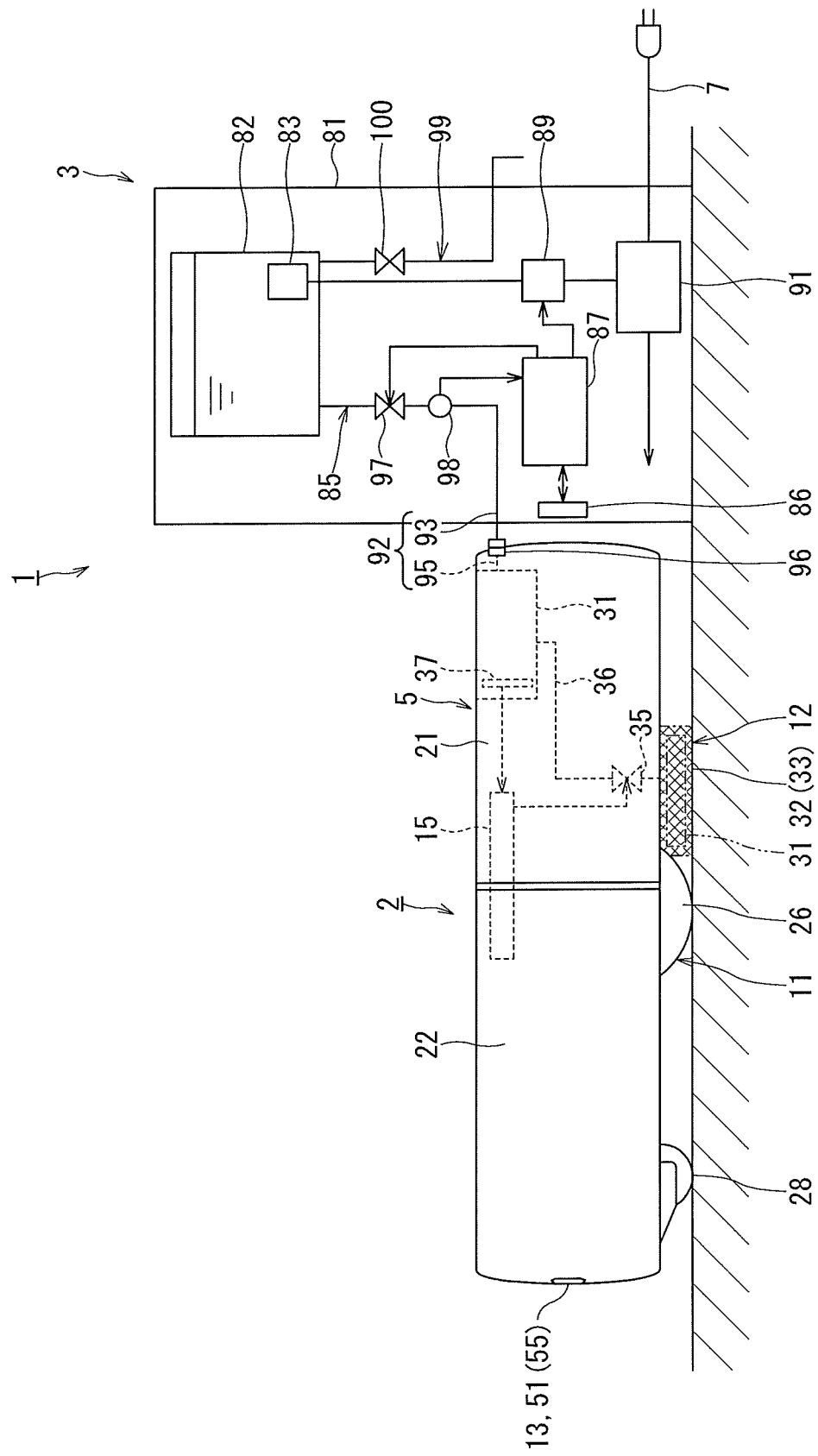
FIG. 5 is a schematic side view of an electric cleaning apparatus that is provided with the station of the first aspect of the present invention.

FIG. 5 is a schematic side view of an electric cleaning apparatus that is provided with the station of the first aspect.

The vacuum cleaner 2 shown in FIG. 5 includes the first reservoir 31 and the first cleaner 32 that are separately provided.

The station 3 (i.e., the first aspect of the station) of the electric cleaning apparatus 1 according to the embodiment of the present invention includes: a main body 81; a second reservoir 82 that is provided with the main body 81 and stores water; an electrolyzed-water generator 83 configured to generate electrolyzed water by electrolyzing the water stored in the second reservoir 82; a supply system 85 configured to supply the first reservoir 31 with the electrolyzed water generated with the electrolyzed-water generator 83 when the vacuum cleaner 2 is connected to the station 3; a second communication unit 86, and a second controller 87.

The second reservoir 82 is a container for storing water and salt water. The second reservoir 82 includes a lid that is openable and closeable. The second reservoir 82 allows being readily filled with water or salt water by opening the lid. The second reservoir 82 may be attachable to and detachable from the main body 81. The allowable amount of water or salt water stored in the second reservoir 82 is preferably larger than the allowable amount of electrolyzed water stored in the first reservoir 31 of the vacuum cleaner 2. The second reservoir 82 capable of storing a larger amount of water than the full amount of electrolyzed water to be stored in the first reservoir 31 reduces the frequency of water supply by a user and improves convenience.

The electrolyzed-water generator 83 electrolyzes water so as to generate electrolyzed water in which ozone is dissolved, and electrolyzes a saline solution so as to generate electrolyzed water in which hypochlorous acid (HClO) is dissolved, for example. For electrodes (not shown) of the electrolyzed-water generator 83, a material that barely dissolves in water, such as titanium or platinum, is used. In order to accelerate the electrolysis, the electrodes may carry or support a platinum group metal such as iridium, platinum, ruthenium or an oxide of a platinum group metal. In the electrolyzed water, chemical species such as hydrogen peroxide, active oxygen and OH radical are generated.

The electrolyzed-water generator 83 is provided in the second reservoir 82. The electrolyzed-water generator 83 may be provided outside the second reservoir 82, for example, may be provided on the supply system 85 (the electrolyzed-water generator 83 shown by the two-dot chain line in FIG. 5). That is, the electrolyzed-water generator 83 may be provided in the second reservoir 82 or in the water passage from the second reservoir 82 to the first reservoir 31. It is sufficient that the electrolyzed-water generator 83 electrolyze the water supplied from the second reservoir 82 to the first reservoir 31 before the water reaches the first reservoir 31. When a third reservoir (not shown) is provided between the second reservoir 82 and the first reservoir 31, the electrolyzed-water generator 83 may electrolyze the water transferred to the third reservoir.

The power supply 89 of the electrolyzed-water generator 83 is branched from a charging power supply 91 that is connected to the power cord 7 and charges the rechargeable battery 6 of the vacuum cleaner 2.

A connection pipe 92 connects the second reservoir 82 of the station 3 to the first reservoir 31 of the vacuum cleaner 2. The supply system 85 includes a second pipe 93 corresponding to a part of the connection pipe 92 laid on the station 3 side. The vacuum cleaner 2 includes a first pipe 95 corresponding to a part of the connection pipe 92 laid on the vacuum cleaner 2 side. The connection portion between the first pipe 95 and the second pipe 93 is provided with a quick connect fitting 96 for readily connecting and disconnecting the first pipe 95 and the second pipe 93.

The supply system 85 supplies the water stored in the second reservoir 82 to the first reservoir 31 by gravity acting on the electrolyzed water. In detail, the supply system 85 uses the difference in level between the level of the electrolyzed water stored in the first reservoir 31 and the level of the water stored in the second reservoir 82 for supplying the electrolyzed water from the second reservoir 82 to the first reservoir 31. In other words, the supply system 85 supplies the electrolyzed water generated in the electrolyzed-water generator 83 to the first reservoir 31 of the vacuum cleaner 2 by using the hydraulic head difference between the first reservoir 31 and the second reservoir 82. The supply system 85 drips the electrolyzed water generated in the electrolyzed-water generator 83 by using the difference in water level between the first reservoir 31 and the second reservoir 82 so as to supply the dripped electrolyzed water to the first reservoir 31 of the vacuum cleaner 2. The electrolyzed water may be supplied so as to flow down from the second reservoir 82 to the water surface of the first reservoir 31. Additionally or alternatively, the electrolyzed water may be supplied so as to flow into the water of the first reservoir 31 through the connection pipe 92 that connects below the water surface of the second reservoir 82 to below the water surface of the first reservoir 31.

It is not necessarily required that the entire amount of water to be stored in the second reservoir 82 is supplied to the first reservoir 31. For example, the second reservoir 82 may have a portion being present at a lower position than the first reservoir 31.

The supply system 85 may be provided with a shutoff valve 97 and a flowmeter 98 that are provided in the middle of the second pipe 93. The shutoff valve 97 is, for example, a solenoid valve.

The shutoff valve 97 is opened and closed by using the electric power supplied to the station 3 via the power cord 7. The station 3 controls the supply amount of the electrolyzed water to be supplied from the second reservoir 82 to the first reservoir 31 by opening and closing the shutoff valve 97. Additionally, the station 3 measures the supply amount of the electrolyzed water having been supplied from the second reservoir 82 to the first reservoir 31 with the flowmeter 98.

The second communication unit 86 includes: a transmitter that includes, for example, an infrared light emitting element and transmits an infrared signal to the vacuum cleaner 2; and a receiver that includes, for example, a phototransistor and receives the infrared signal from the vacuum cleaner 2.

The second controller 87 includes, for example, a central processing unit (CPU), an auxiliary memory, for example, read only memory (ROM), for storing parameters and various calculation programs to be executed (processed) by the central processing unit, and a main memory, for example, random access memory (RAM), in which the work area of the programs is dynamically secured. The auxiliary memory is preferably rewritable, for example, as a non-volatile memory.

The second controller 87 receives information on the required amount of electrolyzed water to be added to the first reservoir 31, from the vacuum cleaner 2 via the second communication unit 86. While monitoring the measured value of the flowmeter 98 (i.e., the supply amount of electrolyzed water), the second controller 87 closes the shutoff valve 97 of the supply system 85 so as to restrict the supply amount of electrolyzed water to be added to the first reservoir 31 when the supply amount reaches the required amount.

The first reservoir 31 of the vacuum cleaner 2 stores the electrolyzed water that is generated with the electrolyzed-water generator 83 and is supplied through the supply system 85. The allowable amount of electrolyzed water stored in the first reservoir 31 of the vacuum cleaner 2 is preferably smaller than the allowable amount of water or salt water stored in the second reservoir 82.

The station 3 may be provided with a second supply system 99 that supplies the electrolyzed water generated with the electrolyzed-water generator 83 from the second reservoir 82 to a place other than the first reservoir 31, for example, near the side face of the station 3. The second supply system 99 supplies the electrolyzed water to the cleaning tool other than the vacuum cleaner 2, such as a mop. The second supply system 99 may be an automatic type that detects the cleaning tool approaching the station 3 by using a proximity sensor and supplies the electrolyzed water to the cleaning tool by opening a second shutoff valve 100. Additionally or alternatively, the second supply system 99 may be a manual type that supplies the electrolyzed water to the cleaning tool according to a user's manual operation on the second shutoff valve 100.

Figure 6:
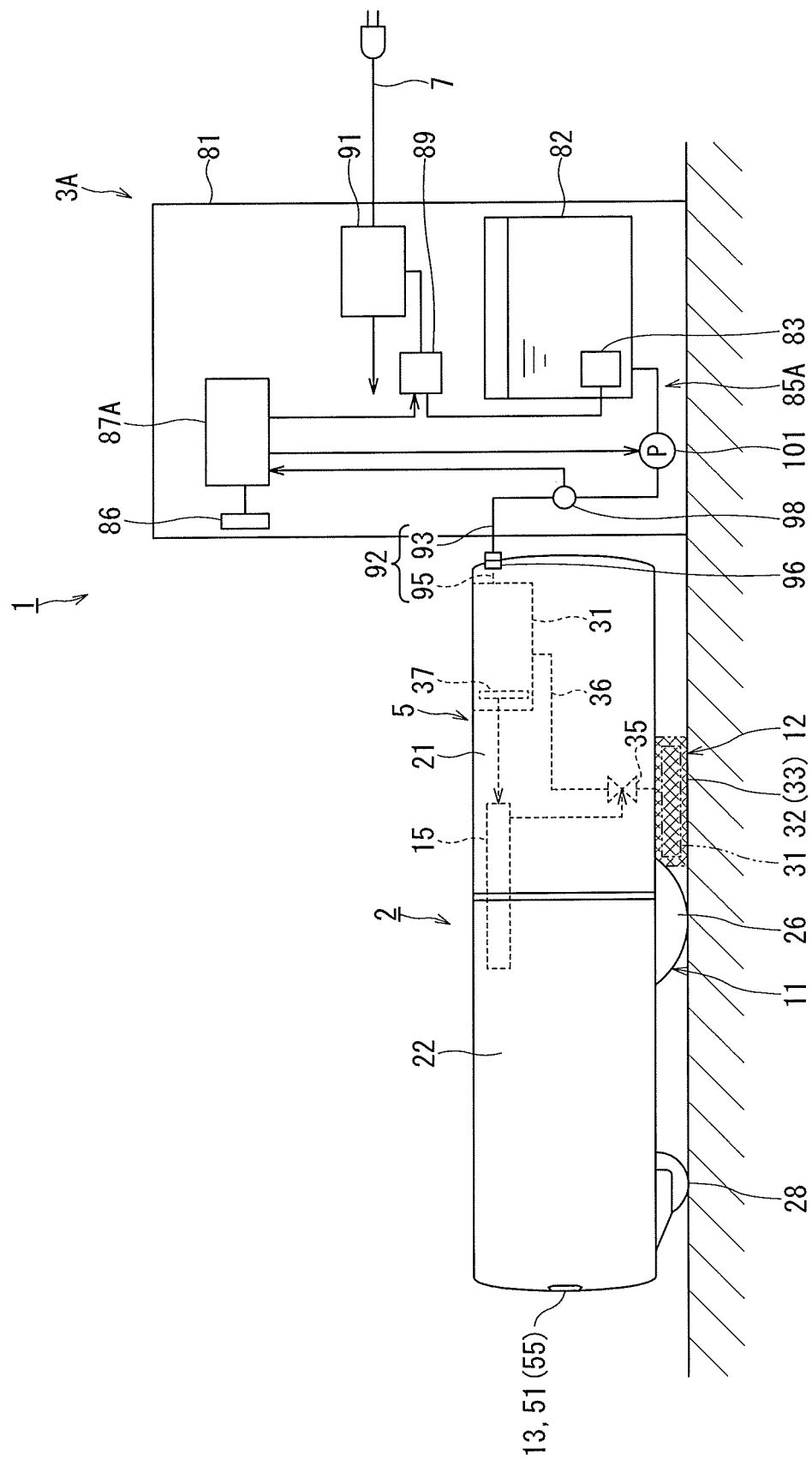
FIG. 6 is a schematic side view of an electric cleaning apparatus that is provided with the station of the second aspect of the present invention.

FIG. 6 is a schematic side view of an electric cleaning apparatus that is provided with the station of the second aspect.

The station 3A (station of the second aspect) of the electric cleaning apparatus 1 according to the embodiment of the present invention includes a supply system 85A that supplies the first reservoir 31 with the electrolyzed water generated with the electrolyzed-water generator 83.

The supply system 85A pressurizes the electrolyzed water generated with the electrolyzed-water generator 83 and then supplies the electrolyzed water to the first reservoir 31. The supply system 85A is provided with a pump 101 that pressurizes and pumps the electrolyzed water generated with the electrolyzed-water generator 83. The pump 101 uses the electric power to be supplied to the station 3A via the power cord 7 for pressurizing the electrolyzed water. The pump 101 supplies the pumped electrolyzed water to the first reservoir 31 of the vacuum cleaner 2. Thus, the station 3A may not need the height difference between the second reservoir 82 and the first reservoir 31 as in the station 3 of the first aspect. In other words, the second reservoir 82 of the station 3A may be disposed at a position higher than the first reservoir 31, at a position lower than the first reservoir 31, or at substantially the same height as the first reservoir 31.

While monitoring the measurement value of the flowmeter 98 (i.e., supply amount of electrolyzed water), the second controller 87A stops the pump 101 when the supply amount reaches the required amount.

Figure 7:
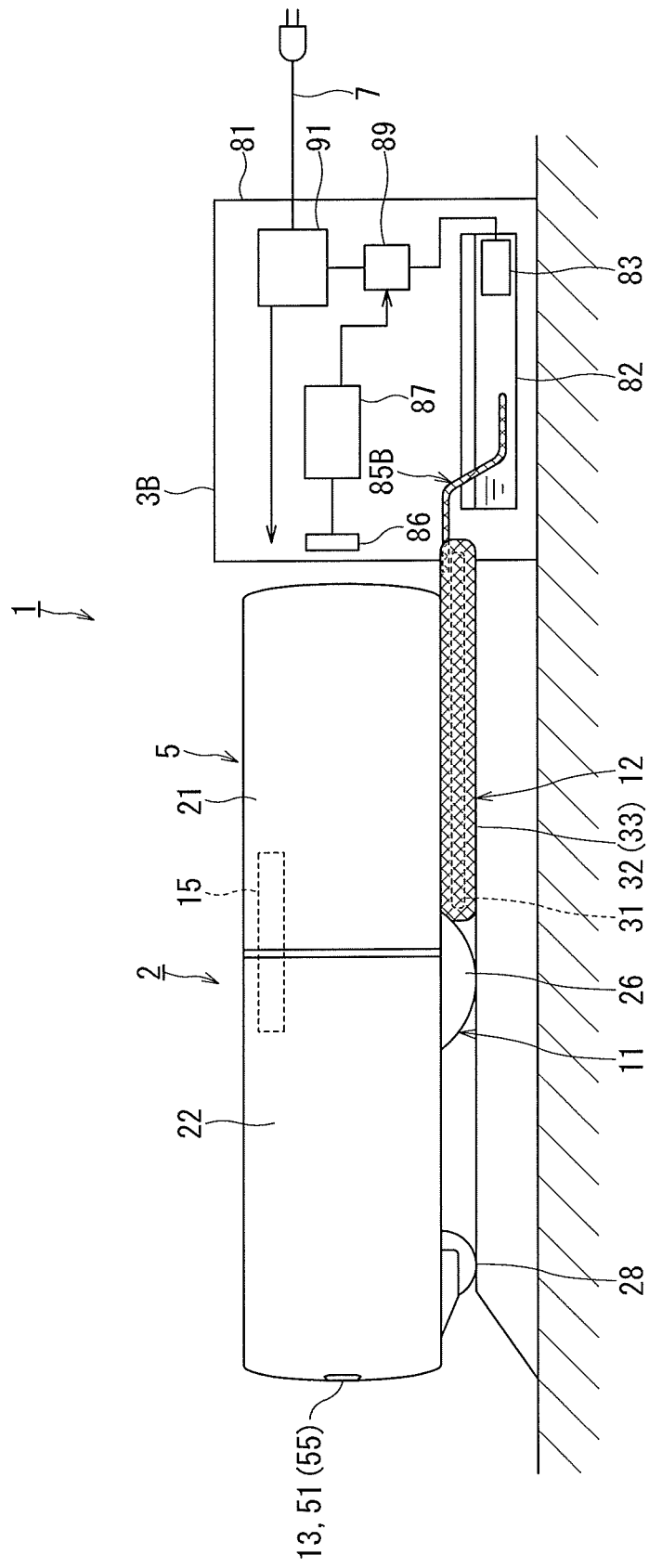
FIG. 7 is a schematic side view of an electric cleaning apparatus that is provided with the station of the third aspect of the present invention.

FIG. 7 is a schematic side view of an electric cleaning apparatus that is provided with the station of the third aspect.

The vacuum cleaner 2 shown in FIG. 7 includes the first reservoir 31 integrated with the first cleaner 32.

The station 3B (i.e., station of the third aspect) of the electric cleaning apparatus 1 includes a supply system 85B that supplies the first reservoir 31 with the electrolyzed water generated with the electrolyzed-water generator 83.

The supply system 85B has water absorbency. The supply system 85B sucks up the electrolyzed water generated with electrolyzed-water generator 83 by capillary action and then supplies the electrolyzed water to the first reservoir 31. One end of the supply system 85B is in contact with the water stored in the second reservoir 82 of the station 3B. The other end of the supply system 85B is disposed at a position where the other end contacts the first reservoir 31 or the first cleaner 32 with the vacuum cleaner 2 connected to the station 3B. When the vacuum cleaner 2 is connected to the station 3B, the supply system 85B directly contacts the first reservoir 31 or indirectly contacts the first reservoir 31 via the first cleaner 32.

The supply system 85B of the station 3B sucks up the electrolyzed water stored in the second reservoir 82 by its water absorbency. When the first reservoir 31 of the vacuum cleaner 2 contacts the supply system 85B of the station 3B, the first reservoir 31 absorbs the electrolyzed water from the supply system 85B. The electric cleaning apparatus 1 of the third aspect supplies electrolyzed water from the side of the station 3B to the side of the vacuum cleaner 2 by bringing an absorbent member into contact with liquid. Even if the first reservoir 31 of the vacuum cleaner 2 is disposed at a position higher than the second reservoir 82 of the station 3B, the supply system 85B sucks up and moves the liquid by capillary action. Oversupply is avoided by the difference in the amount of the water absorbency of the supply system 85B and adjusting the suction power and suction height.

It is preferred that the second reservoir 82 of the station 3B is disposed at a lower position than the first reservoir 31. The supply system 85B may not require electric power to operate as the shutoff valve 97 of the station 3 or the pump 101 of the station 3A. When the level of the electrolyzed water in the first reservoir 31 of the vacuum cleaner 2 reaches a height at which the electrolyzed water cannot be drawn up from second reservoir 82 by surface tension, the supply system 85B automatically stops the supply of electrolyzed water.

Figure 8:
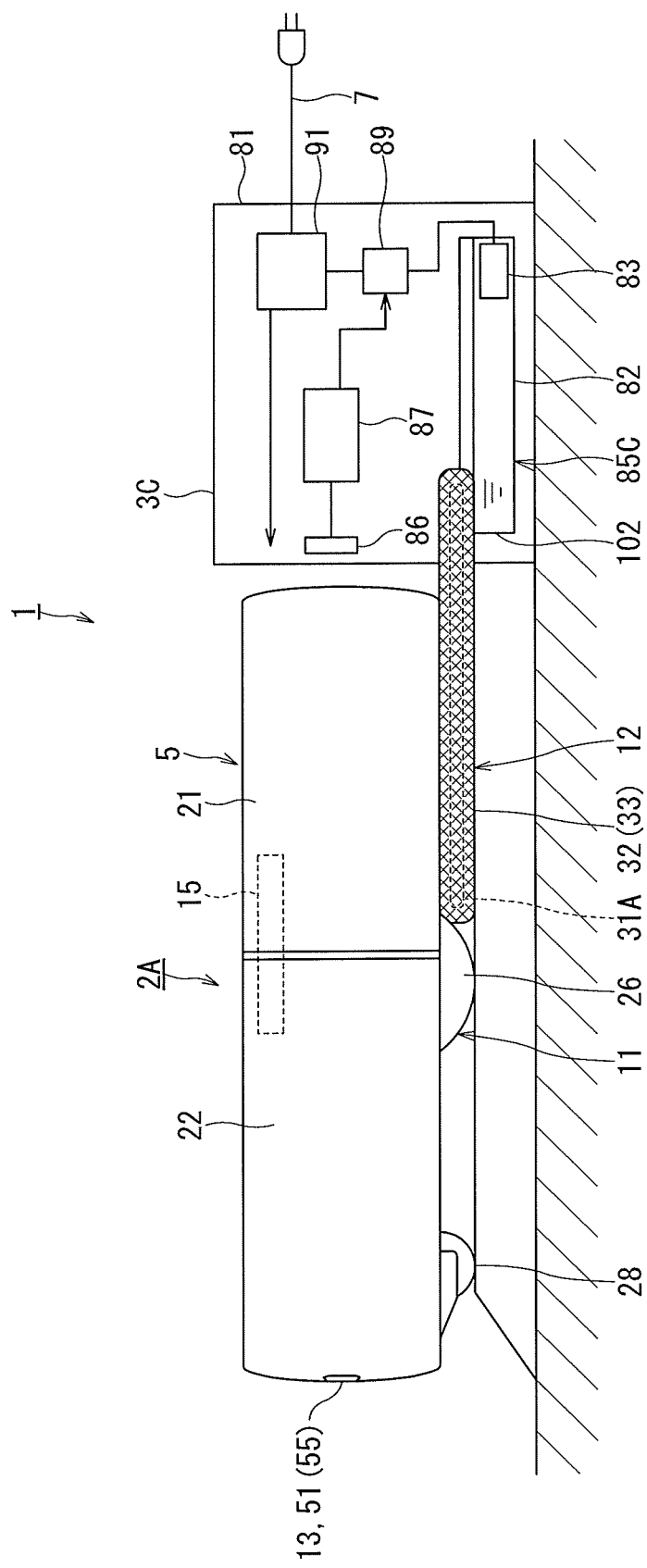
FIG. 8 is a schematic side view of a modification of the electric cleaning apparatus shown in FIG. 7.

FIG. 8 is a schematic side view of a modification of the electric cleaning apparatus shown in FIG. 7.

As shown in FIG. 8, the vacuum cleaner 2A of the electric cleaning apparatus 1 according to the embodiment of the present invention may be configured to directly immerse the first reservoir 31A in the second reservoir 82, instead of the supply system 85B of the station 3B.

The supply system 85C of the station 3C is disposed below the vacuum cleaner 2A when the vacuum cleaner 2A is connected to station 3C. The supply system 85C has a recess 102 for storing electrolyzed water.

The first reservoir 31A of the vacuum cleaner 2A has water absorbency, and is immersed in the recess 102 when the vacuum cleaner 2A is connected to station 3C. In detail, the first reservoir 31A sucks up the electrolyzed water generated with the electrolyzed-water generator 83 directly from the recess 102 by capillary action in a manner similar to the supply system 85B of the station 3B. The first reservoir 31A is a member made of super absorbent polymer (SAP, so-called absorbent polymer, super absorbent resin, or polymeric absorbent) integrated with the wiping cleaning sheet 33.

As described above, the electric cleaning apparatus 1 of each embodiment includes the vacuum cleaner (2, 2A) that includes the first reservoir (31, 31A), and (ii) the station (3, 3A, 3B, 3C). The station (3, 3A, 3B, 3C) includes: the second reservoir 82 configured to store water; the electrolyzed-water generator 83 configured to generate electrolyzed water by electrolyzing the water in the second reservoir 82; and the supply system (85, 85A, 85B, 85C) configured to supply the first reservoir (31, 31A) with the electrolyzed water generated with the electrolyzed-water generator 83 when the vacuum cleaner (2, 2A) is connected to the station (3, 3A, 3B, 3C). Consequently, when the vacuum cleaner (2, 2A) is used for cleaning in the form of storing water in the station (3, 3A, 3B, 3C) instead of the vacuum cleaner (2, 2A), the electric cleaning apparatus 1 allows supplying the electrolyzed water to the vacuum cleaner (2, 2A) in a timely manner so as to perform cleaning with the use of the electrolyzed water. The electric cleaning apparatus 1 does not need to mount the electrolyzed-water generator 83 on the vacuum cleaner (2, 2A) and does not need to supply the electric power necessary for the electrolysis from the rechargeable battery 6, which contributes to reduction in weight, making itself cordless, and increase in operating time by the rechargeable battery 6. Furthermore, the electric cleaning apparatus 1 allows reducing the inconvenience for a user by eliminating manual work of supplying water to the electric cleaning apparatus 1 every time it is used for cleaning.

Additionally, the electric cleaning apparatus 1 allows readily supplying the electrolyzed water generated with the electrolyzed-water generator 83 to the first reservoir 31 by gravity acting on the electrolyzed water.

Further, the electric cleaning apparatus 1 includes the supply system 85A that pressurizes the electrolyzed water generated with the electrolyzed-water generator 83 and supplies the electrolyzed water to the first reservoir 31. Consequently, the electric cleaning apparatus 1 allows freely setting the geometry between the first reservoir 31 and the second reservoir 82 in the vertical direction.

Moreover, the electric cleaning apparatus 1 includes the supply system 85B that sucks up the electrolyzed water generated with the electrolyzed-water generator 83 by capillary action and supplies the electrolyzed water to the first reservoir 31. Consequently, the electric cleaning apparatus 1 allows supplying the electrolyzed water to the vacuum cleaner 2 without requiring a drive source or electric power, and may not include a mechanism of adjusting the supply amount of electrolyzed water and/or stopping the supply of electrolyzed water.

Furthermore, the electric cleaning apparatus 1 includes: the supply system 85C that has a recess 102 for storing electrolyzed water and is disposed below the vacuum cleaner 2A when the vacuum cleaner 2A is connected to the station 3C; and the first reservoir 31A that has water absorbency and is immersed in the recess 102 when the vacuum cleaner 2A is connected to the station 3C. Consequently, the electric cleaning apparatus 1 allows supplying the electrolyzed water to the vacuum cleaner 2A without requiring a drive source or electric power, and may not include a mechanism of adjusting the supply amount of electrolyzed water and/or stopping the supply of electrolyzed water.

In addition, the electric cleaning apparatus 1 controls the supply amount of the electrolyzed water to be supplied to the first reservoir 31 on the basis of the remaining amount of the electrolyzed water in the first reservoir 31. Since the electric cleaning apparatus 1 neither overflows the first storage section 31 nor supplies redundant amount of electrolyzed water to the first storage section 31 beyond the required amount, the weight of the electric vacuum cleaner 2 is not increased unnecessarily. Consequently, even if electrolyzed water leaks from the first storage part 31, the leak amount is suppressed. In addition, the electric cleaning apparatus 1 allows optimizing the supply amount of electrolyzed water to be supplied to the first reservoir 31 depending on the operation history of the vacuum cleaner 2.

Furthermore, the electric cleaning apparatus 1 includes the second cleaner 39 that is provided behind the first cleaner 32 and performs dry wiping on the surface to be cleaned. Consequently, the electric cleaning apparatus 1 efficiently performs both of water wiping with the use of the first cleaner 32 moistened with the electrolyzed water and dry wiping with the use of the dry second cleaner 39 together. In the cleaning with the use of the electric cleaning apparatus 1, there is no bothersome task of replacing the first cleaner 32 moistened with electrolyzed water and the dry second cleaner 39. Hence, the electric cleaning apparatus 1 is used conveniently.

According to the vacuum cleaner 2 of each embodiment, the amount of electrolyzed water to be used for cleaning allows being adjusted to an appropriate amount, and high convenience allows being maintained in terms of power consumption and lightness.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric cleaning apparatus comprising a vacuum cleaner and a station that can be connected to and disconnected from the vacuum cleaner,
    wherein the vacuum cleaner comprises:
        a first reservoir configured to store electrolyzed water; and
        a first cleaner configured to clean a surface to be cleaned by using the electrolyzed water supplied from the first reservoir,
    wherein the station comprises:
        a second reservoir configured to store water;
        an electrolyzed-water generator that generates the electrolyzed water by electrolyzing the water; and
        a supply system configured to supply the first reservoir with the electrolyzed water generated with the electrolyzed-water generator when the vacuum cleaner is connected to the station, and
    wherein the second reservoir includes therein the electrolyzed-water generator, and is further configured to be supplied with water and then store the electrolyzed water generated with the electrolyzed-water generator until a next supply of the electrolyzed water to the first reservoir.

2. The electric cleaning apparatus according to claim 1, wherein the supply system is configured to supply the first reservoir with the electrolyzed water generated with the electrolyzed-water generator by gravity acting on the electrolyzed water.

3. The electric cleaning apparatus according to claim 1, wherein the supply system is configured to pressurizes the electrolyzed water generated with the electrolyzed-water generator and to supply the electrolyzed water to the first reservoir.

4. The electric cleaning apparatus according to claim 1, wherein the supply system is configured to suck up the electrolyzed water by capillary action and to supply the electrolyzed water to the first reservoir.

5. The electric cleaning apparatus according to claim 1, wherein:
the supply system includes a recess configured to store the electrolyzed water, the recess that is disposed below the vacuum cleaner when the vacuum cleaner is connected to the station; and
the first reservoir has a water absorbency and is immersed in the recess when the vacuum cleaner is connected to the station.

6. The electric cleaning apparatus according to claim 1, further comprising a remaining amount detector configured to detect remaining amount of the electrolyzed water in the first reservoir,
wherein the supply system is configured to control amount of the electrolyzed water to be supplied to the first reservoir based on the remaining amount.

7. The electric cleaning apparatus according to claim 1, wherein the vacuum cleaner further comprises a second cleaner that is disposed behind the first cleaner and is configured to perform dry wiping on a surface to be cleaned.

8. The electric cleaning apparatus according to claim 1, wherein the station further comprises a second supply system configured to supply the electrolyzed water generated with the electrolyzed-water generator to a component except the first reservoir.

9. A station connectable to and disconnectable from a vacuum cleaner that includes a first reservoir configured to store electrolyzed water and a first cleaner configured to clean a surface to be cleaned by using the electrolyzed water supplied from the first reservoir, the station comprising:
a second reservoir configured to store water;
an electrolyzed-water generator configured to generate the electrolyzed water by electrolyzing the water in the second reservoir; and
a supply system configured to supply the first reservoir with the electrolyzed water generated with the electrolyzed-water generator when the vacuum cleaner is connected to the station,
wherein the second reservoir includes therein the electrolyzed-water generator, is further configured to be supplied with water and then store the electrolyzed water generated with the electrolyzed-water generator until a next supply of the electrolyzed water to the first reservoir.

10. The electric cleaning apparatus according to claim 2, further comprising a remaining amount detector configured to detect remaining amount of the electrolyzed water in the first reservoir,
wherein the supply system is configured to control amount of the electrolyzed water to be supplied to the first reservoir based on the remaining amount.

11. The electric cleaning apparatus according to claim 3, further comprising a remaining amount detector configured to detect remaining amount of the electrolyzed water in the first reservoir,
wherein the supply system is configured to control amount of the electrolyzed water to be supplied to the first reservoir based on the remaining amount.

12. The electric cleaning apparatus according to claim 4, further comprising a remaining amount detector configured to detect remaining amount of the electrolyzed water in the first reservoir,
wherein the supply system is configured to control amount of the electrolyzed water to be supplied to the first reservoir based on the remaining amount.

13. The electric cleaning apparatus according to claim 5, further comprising a remaining amount detector configured to detect remaining amount of the electrolyzed water in the first reservoir,
wherein the supply system is configured to control amount of the electrolyzed water to be supplied to the first reservoir based on the remaining amount.

14. The electric cleaning apparatus according to claim 2, wherein the vacuum cleaner further comprises a second cleaner that is disposed behind the first cleaner and is configured to perform dry wiping on a surface to be cleaned.

15. The electric cleaning apparatus according to claim 3, wherein the vacuum cleaner further comprises a second cleaner that is disposed behind the first cleaner and is configured to perform dry wiping on a surface to be cleaned.

16. The electric cleaning apparatus according to claim 4, wherein the vacuum cleaner further comprises a second cleaner that is disposed behind the first cleaner and is configured to perform dry wiping on a surface to be cleaned.

17. The electric cleaning apparatus according to claim 5, wherein the vacuum cleaner further comprises a second cleaner that is disposed behind the first cleaner and is configured to perform dry wiping on a surface to be cleaned.

18. The electric cleaning apparatus according to claim 6, wherein the vacuum cleaner further comprises a second cleaner that is disposed behind the first cleaner and is configured to perform dry wiping on a surface to be cleaned.

19. The electric cleaning apparatus according to claim 2, wherein the station further comprises a second supply system configured to supply the electrolyzed water generated with the electrolyzed-water generator to a component except the first reservoir.

* * * * *